Dec. 26, 1961

R. NAGETUSCH 3,014,753

HOUSE TRAILER

Filed Jan. 8, 1960

2 Sheets-Sheet 1

Dec. 26, 1961   R. NAGETUSCH   3,014,753
HOUSE TRAILER

Filed Jan. 8, 1960   2 Sheets-Sheet 2

United States Patent Office 3,014,753
Patented Dec. 26, 1961

3,014,753
HOUSE TRAILER
Richard Nagetusch, Possendorfer Strasse 26,
Dresden A20, Germany
Filed June 8, 1960, Ser. No. 34,660
4 Claims. (Cl. 296—23)

This invention relates to a trailer for motorcars which is particularly designed for being used as a house trailer. It is the object of the present invention to manufacture a comfortable house trailer of stable construction and light weight which has simultaneously an elegant appearance. It can be manufactured two-wheeled or four-wheeled.

The novelty of the trailer which is made of a hard wood framework covered with aluminium sheet includes:

(a) That it is provided with an arch-wise elevated gangway roof the cover of which can be lifted for the purpose of aeration;

(b) That it has the floor cut out about to the beginning of the gangway roof, the cut-out being shut by a covering plate arranged at the lower part of the door in the back wall of the car;

(c) That it has a table leaf which lies at one end loosely on the front wall of the car and is supported at the other end by a tiltable central stay and can be shifted on battens of the lateral benches for forming a plank-bed.

The arch of the gangway roof rests on screw bolts arranged at the wall of the car and is secured in closed position by pivoted clamping levers.

The door provided in the back wall is transversely divided, and upper part can be opened on its own. At the lower part of the door forked clips for the fixing bolts are provided which are pivoted at the upper part.

Outside of the body of the car on the pole tube an aluminium container for the cooking-gas bottle is mounted.

The interior equipment can be adapted at choice to any desired purpose and any taste. For instance the trailer may be completed as a kitchen car, exhibition car, shop car or the like.

Figure 1:
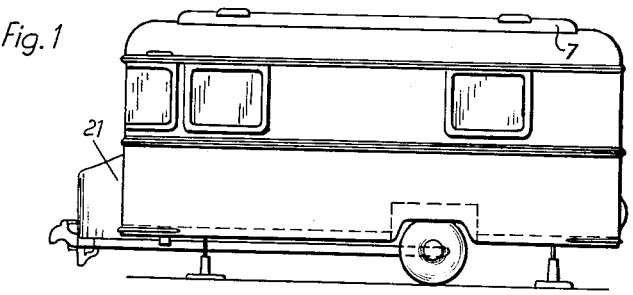
Figure 3:
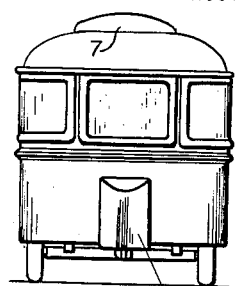
Figure 2:
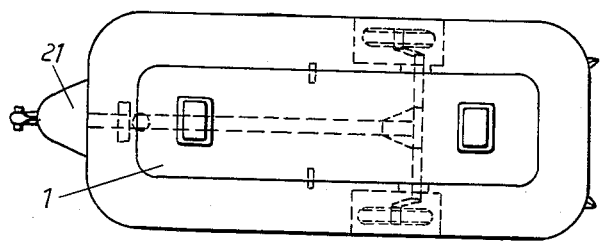
Figure 4:
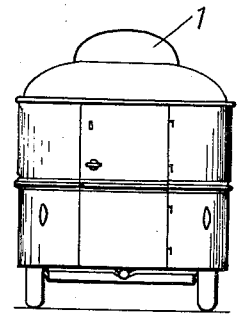
Figure 9:
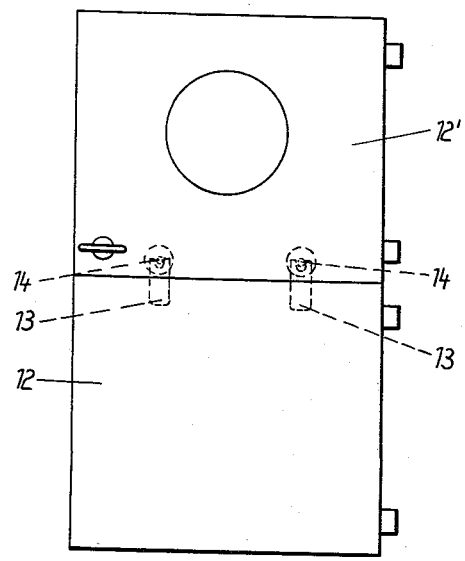
Figure 10:
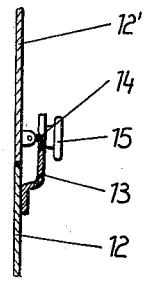
Figure 5:
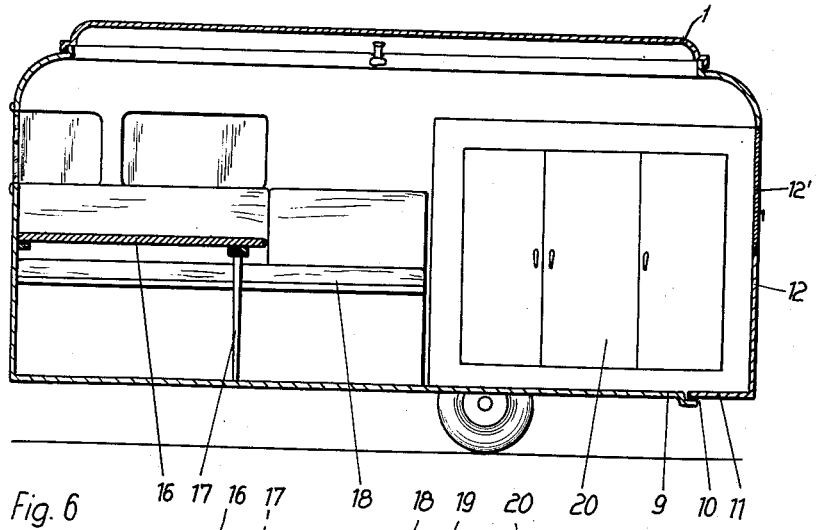
Figure 6:
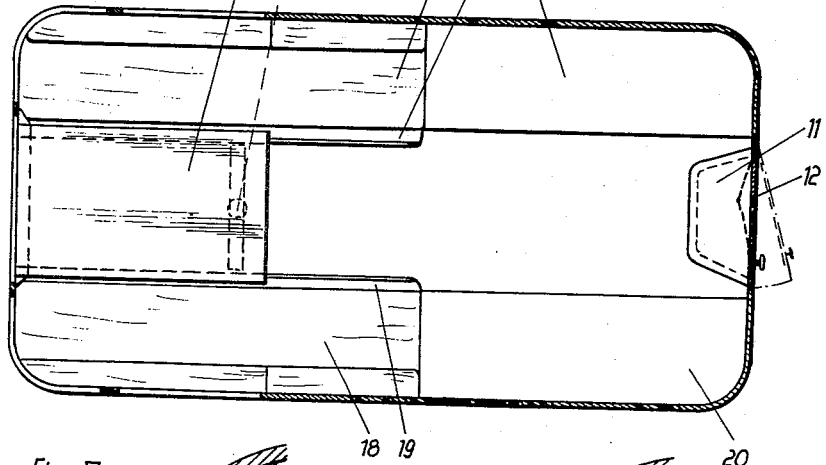
Figure 7:
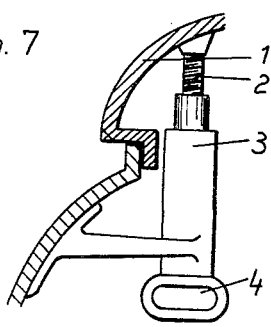
Figure 8:
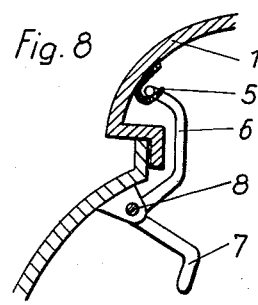

Reference will now be made to the accompanying drawings which illustrate as a house trailer by way of example a construction according to the invention and in which:

FIG. 1 is a side view of a two-wheeled trailer;
FIG. 2 is the corresponding top view, whereas
FIG. 3 is the front view, and
FIG. 4, the back view;
FIG. 5 is a longitudinal section through the trailer on a somewhat enlarged scale;
FIG. 6 is the corresponding top view, the cover of the car being removed;
FIGS. 7 and 8 show the devices for lifting and locking the arch of the gangway roof;
FIG. 9 is a view of the transversally divided door, of which
FIG. 10 shows the fixing device.

The trailer, built-up by cantilever hard-wood lattice trusses covered with aluminium sheet, has an arch-wise gangway roof 1 which extends over the gangway area of the trailer in the center thereof almost at full length of the car.

The arch 1 of the gangway roof can be lifted for providing ventilation slots. It is supported by screw bolts 2 (FIG. 7) which can be adjusted in sleeves 3 attached to the wall of the car, by means of handle grips 4. According to the rotary motion of the grips 4, the arch 1 of the gangway roof is raised or lowered to the roof of the car. Rainproof closing is ensured by suitable means.

At the arch 1 of the gangway roof hooks 5 (FIG. 8) are arranged engaged by levers 6 linked to clamping levers 7 which are pivoted in bearings 8 attached to the wall of the car. When the arch 1 is closed the levers 7 are actuated so as to tighten the opening of the roof, similar to a patent bottle stopper.

The floor 9 of the car is cut out from the rear of the trailer to the beginning of the gangway roof 1. A cut-out 10 is shut by a covering plate 11 attached to door 12 in the back wall of the car. This means that the floor 9 is only treaded on when the gangway roof 1 is reached and sufficient headroom is available.

The door consist of the two parts 12, 12' (FIGS. 9, 10), the parting line running transversally about in the centre of the door. The upper part 12' can be separately opened outwards. At the lower part 12 of the door, forked clips 13 are provided which engage bolts 14 pivoted at the upper part 12' of the door. After loosening knobs 15 of the bolts 14, the latter can be turned upwards. The upper part 12' of the door can then be opened outwards. The knobs 15 are loosened and tightened by screwing.

In the interior of the car a table leaf 16 is supported by the front wall, the free end being supported by a tiltable central stay 17. At the sides of the table leaf 16 benches 18 are arranged having cushions on the seats and at the back. The table leaf 16 can be pulled out backwards and put on battens 19 provided at the benches 18, thus forming a plank bed extending over the full width of the car. The table leaf can be covered by the cushions of the benches 18. The remaining space of the car is occupied by cases and shelves 20. The interior equipment can be formed at choice, e.g. it can have a wardrobe and a linen-press besides seating and resting accommodations, a propane-gas cooker, a washing stand, refrigerator, mains supply etc.

The cooking-gas bottle is placed in an aluminium container 21 which is mounted on the pole tube.

The trailer can be manufactured in different sizes with two or four wheels.

What I claim is:

1. A compact lightweight trailer constructed of a hardwood frame covered with aluminum sheet and comprising a floor having a gangway area centrally thereof, front, rear, and side walls supported by said floor and extending inwardly at their upper end to form an opening above said gangway area, an arched gangway roof supported by said walls and covering said opening, means between said walls and said gangway roof for lifting said gangway roof whereby air may be admitted through said open area, said floor being formed with a cut-out portion extending inwardly from an edge thereof to said gangway area and to a plane substantially in common with an outer edge of said gangway roof, a doorway in one of said walls and adjacent said cut-out portion, a door mounted in said doorway for closing the same and providing an inwardly extending plate member at its lower end, said plate member covering said cut-out portion when said door closes said doorway.

2. The compact lightweight trailer of claim 1, wherein said means between said walls and said gangway roof comprises screw bolts threadedly connected to said walls adjacent the upper edges thereof and separate means are provided between said roof and said walls for securing said roof in a lowered or closed position, said means comprising tiltable clamping levers.

3. The compact lightweight trailer of claim 2, wherein said door is transversely divided and the upper part of said door may be opened and closed independently of the bottom part of said door.

4. The compact lightweight trailer of claim 3, wherein the upper and lower parts of said door provide complementary forked clips and fixing bolts arranged for cooperative action therebetween to secure the upper and lower parts together whereby said upper and lower parts may operate as a single door.

(References on following page)

References Cited in the file of this patent

UNITED STATES PATENTS

| | | |
|---|---|---|
| 912,840 | Graham et al. | Feb. 16, 1909 |
| 1,937,900 | Levy et al. | Dec. 5, 1933 |
| 1,998,937 | McGinnis | Apr. 23, 1935 |
| 2,743,955 | Willson | May 1, 1956 |

FOREIGN PATENTS

| | | |
|---|---|---|
| 20,208/34 | Australia | Sept. 2, 1935 |
| 317,662 | Great Britain | Aug. 22, 1929 |
| 145,820 | Sweden | June 15, 1954 |

OTHER REFERENCES

"Kampers Kabin," publication, pages 2 and 3, February 1960, by Kampers Kabin, Van Nuys, Calif.